United States Patent Office
3,707,346
Patented Dec. 26, 1972

3,707,346
SUBLIMATORY TRANSFER DYEING WITH 2-CYA-
NO-1,4-DIAMINO ANTHRAQUINONES
Juergen Markert, Basel, Peter Eckert, Madgen, Aargau,
and Angelo Della Casa, Basel, Switzerland, assignors to
Ciba-Geigy AG, Basel, Switzerland
No Drawing. Filed Jan. 12, 1971, Ser. No. 105,976
Claims priority, application Switzerland, Jan. 16, 1970,
59,470
Int. Cl. D06p
U.S. Cl. 8—2.5
7 Claims

ABSTRACT OF THE DISCLOSURE

Non-textile sheet materials for carrying out transfer printing, characterized in that they carry a dyestuff of the formula

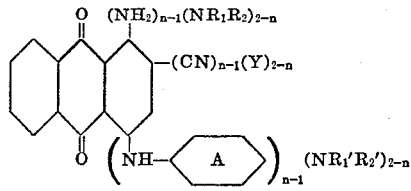

wherein the ring A is aromatic or saturated, $R_1$ is a hydrogen atom or an alkyl radical containing 1 to 6 carbon atoms, $R_2$ represents a hydrogen atom or an alkyl radical containing 1 to 6 carbon atoms, Y is a hydrogen, a bromine or a chlorine atom or a methoxy group, $R_1'$ denotes a hydrogen atom or an alkyl radical containing 1 to 6 carbon atoms, $R_2'$ represents an alkyl group containing 1 to 6 carbon atoms, and $n$ is 1 or 2, with the proviso that if Y is a hydrogen atom, the alkyl groups present must contain at least 3 carbon atoms, or a mixture of such dyestuffs and optionally other sublimable dyestuffs and/or optical brighteners.

---

It is known to print textile materials that are in the form of webs by means of textile printing machines that have engraved printing rollers. Very recently, the so-called transfer printing has become known, wherein the dyestuffs are transferred onto the textile substrate by diffusion and sublimation from printed intermediate or auxiliary carriers, chiefly paper webs.

The present invention relates to non-textile sheet materials for carrying out the transfer printing, characterized in that they are printed with a dyestuff of the formula

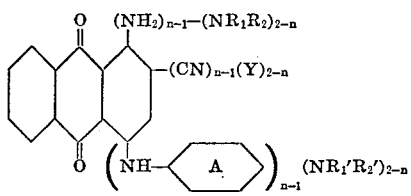

wherein the ring A is aromatic or saturated, $R_1$ is a hydrogen atom or an alkyl radical containing 1 to 6 carbon atoms, $R_2$ represents a hydrogen atom or an alkyl radical containing 1 to 6 carbon atoms, Y is a hydrogen, a bromine or a chlorine atom or a methoxy group, $R_1'$ denotes a hydrogen atom or an alkyl radical containing 1 to 6 carbon atoms, $R_2'$ represents an alkyl group containing 1 to 6 carbon atoms, and $n$ is 1 or 2, with the proviso that if Y is a hydrogen atom, the alkyl groups present must contain at least 3 carbon atoms, and optionally together with other dyestuffs and/or optical brighteners.

Preferred are dyestuffs of the formulae

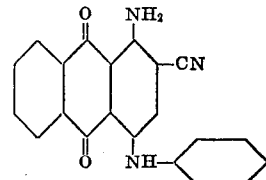

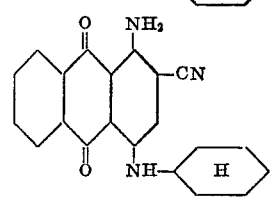

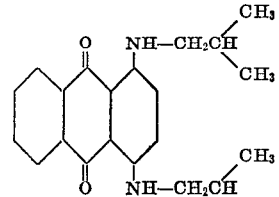

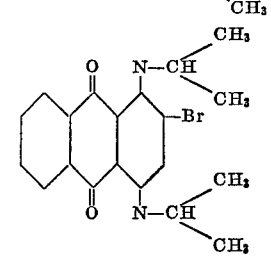

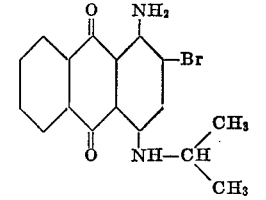

and the chlorine analog thereof

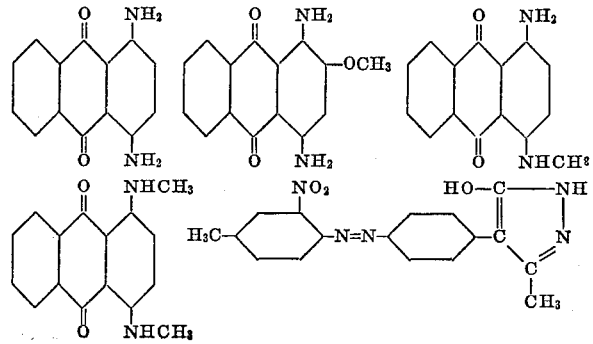

In the case of the other dyestuffs that may be concurrently employed, these can be any dyestuffs and/or optical brighteners that are suitable for the transfer printing by virtue of this sublimation and diffusion behaviour, for example dispose dyestuffs of the following chemical classes: anthraquinoid dyestuffs, such as hydroxyanthraquinones and/or aminoanthraquinones, azo dyestuffs, quinophthalone dyestuffs, styryl dyestuffs or nitrodiarylamines.

Particularly suitable dyestuffs are the monoazo, styryl, anthaquinone and quinonaphthalone dyestuffs such, for example, as dyestuffs of the following formulae:

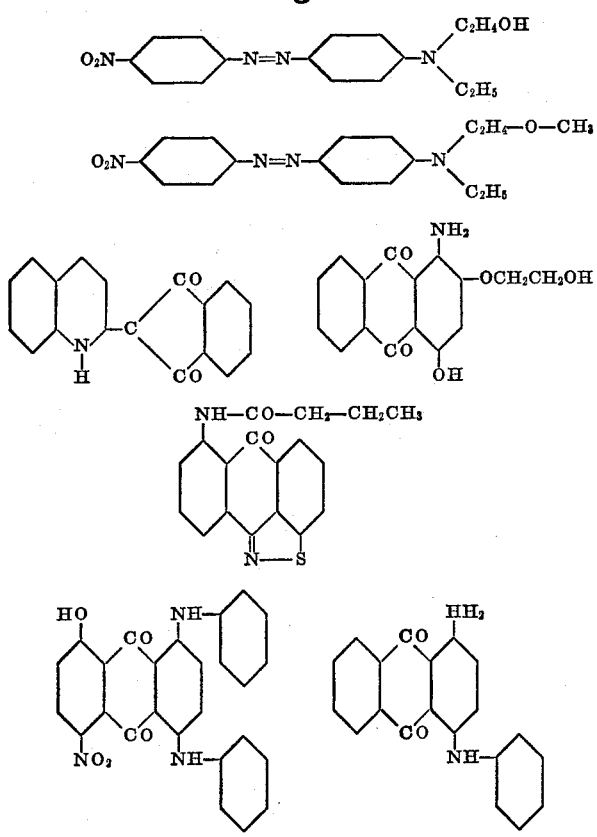

As anthraquinoid dyestuffs that may be concurrently employed, particular mention may be made of derivatives of 1,8-dihydroxy-4,5-diamino-anthraquinone. The unsubstituted hydroxyamino-anthraquinones can also be used as dyestuffs, for example 1,8-dihydroxy-4,5-diamino-anthraquinone and/or 1,5-dihydroxy-4,8-diamino-anthraquinone.

The optical brighteners that may be considered are chiefly monazol and bisazol as also benzoxazol derivatives such, for example, as the brightener of formula

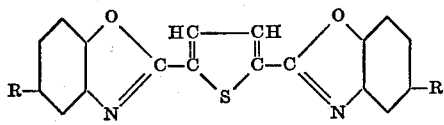

wherein R is hydrogen, iso-propyl, methyl or tert.-butyl.

The dyestuffs that may be concurrently employed are advantageously those that on heating behave analogously to the chlorinated dihydroxydiamino-anthraquinones according to the invention, especially those that possess similar sublimation features.

Suitable textile substrates are chiefly woven fabrics, knitted fabrics or fibre fleeces (non-wovens), which, for example, can be in the form of webs, piece goods or finished goods, but can also be films based on synthetic materials such, for example, as those of acrylonitrile, for example polyacrylonitrile and copolymers of acrylonitrile and other vinyl compounds, for example acrylic esters, acryl amides, vinylpyridine, vinyl chloride or vinylidene chloride, copolymers of dicyanoethylene and vinyl acetate, as also of acrylonitrile block copolymers, materials of polyvinyl chloride, cellulose triacetate and cellulose 2½-acetate, materials of aromatic polyesters such, for example, as those of terephthalic acid and ethylene glycol or 1,4-dimethylcyclohexane and copolymers of terephthic acid and isophthalic acid with ethylene glycol, and especially materials from polyamides, for example polyamide-6, polyamide-6,6 or polyamide-12. The printing of anodised aluminum is also possible using the process of the present invention.

It is also possible to print mixed woven fabrics or knitted fabrics of the materials with one another, and in particular these may comprise purely synthetic hydrophobic fibres or natural and synthetic fibres.

Any kind of materials, for example wool or cotton, which are impregnated, finished or coated with a synthetic polymer that can be printed according to the transfer printing process, can likewise be printed according to this latter process.

In the case of multi-color printing according to the transfer printing process, the chlorinated diaminodihydroxyanthraquinones to be used according to the invention is used together with other dyestuffs that sublime and/or diffuse in the same temperature range.

The intermediate or auxiliary carriers can be any kind of structures, preferably non-textile ones, for which disperse dyestuffs do not possess any affinity, for preference shaped structures based on cellulose, chiefly paper, but also sheets of regenerated cellulose, which can be printed in the desired pattern with aqueous, or preferably at least partially organic printing inks, especially printing inks that are virtually anhydrous. Suitable carriers are also metal sheets; but chiefly paper is used as carrier.

The dyestuffs are applied and dried by printing, but this can also be done by impregnating or dyeing the intermediate carrier in the dyestuff solution or dispersion (for example, in a dye bath).

The intermediate carriers can also be printed on both sides, in the process of which dissimilar dyes and/or patterns can be selected for the two sides. In order to avoid using a printing machine, the printing links can be sprayed onto the auxiliary carrier, for example by using a spray gun. Particularly interesting effects are obtained if more than one shade is printed or sprayed onto the auxiliary carrier simultaneously. In the process, certain patterns can be obtained, for example by using stencils, or artistic patterns can be produced by using a brush. If the auxiliary carriers are printed, the most diverse forms of printing techniques can be employed, for example the emulsion process, the flat printing process (e.g. offset, the high-pressure process (e.g. book printing, flexo-printing), the photogravure process (e.g. cylinder printing, rotary gravure, print engraving), penetration of prints process (e.g. silk screen, film printing), or the electrostatic printing process.

A particular embodiment of the transfer process consists in applying, instead of a complete web, only pieces of the carrier to the material to be printed.

These pieces are obtained by punching or cutting the above mentioned printed or dyed intermediate carriers into suitably formed segments, for example into flowers, rings, triangles, circles, stars, strips and so forth. The undyed intermediate carrier pieces can also be dyed or impregnated with the dyestuff(s), for example by dipping them into an appropriate dyestuff solution or dispersion.

These paper pieces are then scattered manually or by means of a suitable mechanical device onto the material to be printed and are subsequently heated to the sublimation temperature in a suitable device, for example an ironing press.

The two sides of a woven fabric, knitted fabric or fleece can be printed simultaneously or successively with identical or different patterns. It is also possible to apply a complete paper web, impregnated with the dyestuff, over the top of the scattered pieces of paper to be printed, and in this way a reserve effect is achieved in which the reserved areas are simultaneously printed.

A special reserve effect is obtained if undyed pieces, for example paper pieces, are used together with, or optionally instead of, the colored intermediate carrier pieces. It is also possible to place the pieces of intermediate carrier between two textile webs and in this way to print both textile webs simultaneously.

On using dispersions, the dyestuffs dispersed in the printing color must in the main have a particle size of ≤10μ.

preferably ≤2μ. Besides water, practically all organic solvents are possible that boil at atmospheric pressure at temperatures below 220° C., preferably below 150° C., and which possess a solubility or emulsifiability (dispersibility) for the dyestuffs and binders to be used. Exemplary of organic solvents that may be used are: aliphatic and aromatic hydrocarbons, for example n-heptane and benzene, xylene or toluene; halogenated hydrocarbons, for example methylene chloride, trichloroethylene or chlorobenzene, nitrated aliphatic hydrocarbons, for example nitropropane, aliphatic amides, for example dimethylformamide or mixtures thereof; furthermore, glycols, for example ethylene glycol or polyethylene glycol-monoethylether or polyethylene glycol-diethylether, diethylcarbonate, dimethylcarbonate or esters, for example ethyl acetate, propylacetate, butylacetate, β-ethoxyethyl acetate; aliphatic or cycloaliphatic ketones, for example methylethyl ketone, methylisobutyl ketone, cyclo hexanone, isophorone, mesityloxide or diacetone alcohol; mixtures of an aliphatic ketone, for example methylethyl ketone, and of an aromatic hydrocarbon, for example toluene; and alcohols, for example methanol, ethanol and preferably n-propanol, isopropanol, n-butanol, tert.-butanol, sec.-butanol or benzylalcohol; furthermore, mixtures of several solvents are possible that contain at least one solvent from one of the above named classes. Printing inks that are practically anhydrous are used with advantage.

Especially preferred solvents are esters, ketones or alcohols, for example butyl acetate, acetone, methylethyl ketone, ethanol, isopropanol or butanol.

In addition to the dyestuff or brightener and solvent (diluent), the printing colors (inks) to be used according to the invention also contain preferably at least one binder, which acts on the material to be printed as thickener of the printing color and at least as temporary binder of the dyestuff. Synthetic, semi-synthetic and natural resins, which is to say both polymerisation as well as polycondensation and polyaddition products, are suitable as such binders. In principle, all resins and binders customary in the printing ink and paint industry, such as are, for example, described in the lacquer raw material tables of Karsten (4th edition, Hanover, 1967) and in Wagner and Sarx's work on lacquer resins (4th edition, Munich, 1959), are used. Preferably, physically drying resins are used, i.e. resins that do not react (or cross-link) in the atmosphere or with each other chemically, but leave behind a dry film after the solvent has been removed. The use of resins that are soluble in the solvents used is advantageous.

The following, for example, are suitable resins: colophony and derivatives thereof, hydrogenated colophony, di- or polymerised colophony, as calcium or zinc salt, with colophony esterified with mono- or polyvalent alcohols; with resinifiers such as acrylic acid and butane diol or maleic acid and pentaerythritol modified colophony resin; the soluble phenol resins modified with colophony and resins based on acrylic compounds, maleinate resins, oil-free alkyd resins, styrolated alkyd resins, vinyl toluene modified alkyd resins, alkyd resins with synthetic fatty acids, linseed oil alkyd resins, ricinene alkyd resins, castor oil alkyd resins, soy oil alkyd resins, cocoanut oil alkyd resins, tall oil and fish oil alkyd resins, acrylated alkyd resins, also oils and oil varnishes. Also suitable are terpene resins, polyvinyl resins such as polyvinyl acetate, polyvinyl chloride, polyvinylidene chloride, polyvinyl acetals, polyvinyl alcohol, polyvinyl ether, copolymers and graft polymers with various vinyl monomers, polyacrylic resins, acrylate resins, polystyrenes, polyisobutylenes, polyesters based on phthalic acid, maleic acid, adipic acid, sebacic acid etc., naphthalene formaldehyde resins, furane resins, ketone resins, aldehyde resins, polyurethanes (especially urethane primary-products that cure only at elevated temperature), epoxide resins (especially resin-curer mixtures that cure only at elevated temperature) and precondensates thereof. Suitable too are primary-products of unsaturated polyester resins, dialkylphthalate-prepolymers, polyolefines such as polyethylene wax or polpropylene wax, indene and cumaronindene resins, carbamide and sulphonamide resins, polyamide and polyester resins, silicon resins, rubber and derivatives thereof, for example cyclorubber and chlorinated rubber, chiefly, however, cellulose derivatives such as cellulose esters (nitrocellulose, cellulose acetate and the like), and especially cellulose ethers, for example methylcellulose, hydroxyethylcellulose, hydroxypropylcellulose, propionitrile cellulose, ethyl cellulose and benzylcellulose. The corresponding derivatives of other polysaccharides can also be used.

The printing colors (solutions, dispersions, emulsions) manufactured by usual methods with the resins, dyestuffs, solvents or lithographic varnishes mentioned are applied directly onto the auxiliary carrier to be printed according to the processes indicated above.

In order to improve the suitability of the printing inks, optional components can be added, for example plasticizers, swelling agents, high boiling solvents such, for example, a Tetralin or Decalin, ionic or non-ionic surface-active compounds such, for example, as the condensation product of β-naphthalinsulphonic acid with formaldehyde, partially desulphonated lignin sulphonate, or the condensation product of 1 mol octylphenol with 8 to 10 mols ethylene oxide.

The quantitive composition of the printing colors with respect to resin mixture and solvent mixture is determined by two requirements.

If solvents are used, they must be present in such amounts that the resin remains dissolved and/or dispersed, and on the other hand, the amount of the solvent must be within such limits that the viscosity of the printing color has the necessary value for carrying out the printing process. Thus, for example, in gravure printing good results are obtained as a rule by using a proportion of resin: solvent that lies between 1:0.5 and 1:50, preferably between 1:1 and 1:20.

Water-soluble thickeners such, for example, as polyvinyl alcohol, carob bean flour, methyl cellulose or water-soluble polyacrylates are used in aqueous inks.

In order to manufacture the printing inks, dyestuff preparations are used that contain the above named anthraquinone dyestuffs and a resin, which can be identical with, or different from, the above named thickeners. If it is different from them, then the resin in question may also be a low molecular resin that produces no thickening effect and only serves to prevent an agglomeration of the finely ground dyestuff. It is preferable to use the above named cellulose derivatives as resin.

The transfer printing is carried out in the usual way. To this end, the carriers are brought into contact with the textile materials and maintained at sublimation or diffusion temperature for as long as it taken the dyestuffs applied to the auxiliary carrier to be transferred onto the textile material, As a rule a brief heating (10 to 60 seconds) to 150 to 220° C. suffices for this purpose. Transfer prints are also possible at lower temperatures, for example on polyvinyl chloride at 110° C. The transfer printing may be carried out continuously on, for example, a heated roller or also by means of a heated plate (flat iron or warm press), or by using steam or dry warm air, under atmospheric pressure or in vacuo.

If the transfer printing is carried out by means of steam, the steam jet can, for example, be sent through the organ that presses against the substrate to be printed, or it can be sent through the substrate to be printed, for which purpose perforated cylinders, for example, can be used.

The following examples illustrate the invention. In the examples, the parts, unless otherwise stated, denote parts by weight and the percentages denote percentages by weight. The relationship between parts by weight and parts by volume is the same as that between the gram and millilitre.

EXAMPLE 1

5 parts of the blue dyestuff of the formula

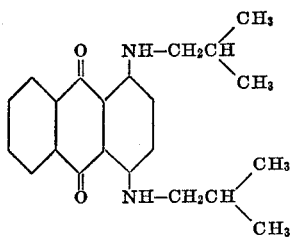

10 parts of ethyl cellulose (Ethocel E7, Dow Chem.) and 85 parts of ethanol are ground in a ball mill for 24 hours. With the printing ink so obtained it is possible to print a paper that serves as auxiliary carrier. A blue pattern is thereby obtained.

EXAMPLE 2

5 parts of the dyestuff used in Example 1,
15 parts of nitrocellulose A250 (containing 18% of dibutylphthalate),
10 parts of glycol monoethylether,
30 parts of methyl-ethyl-ketone and
40 parts of ethanol are stirred for 15 minutes with a toothed attrition mill having a circumferential speed of approx. 12 m./sec. and the printing ink so obtained is printed on paper, on which a blue pattern is formed.

EXAMPLE 3

(a) A printing ink consisting of 5 parts of the dyestuff mentioned in Example 1 dissolved in 5 parts of ethyl cellulose (Ethocel E7, Dow Chem.) and 90 parts of methyl-ethyl-ketone, is printed on paper. A blue pattern is obtained.

(b) A sized paper is dipped for a brief period (e.g. 10 seconds) into the dyestuff solution and the solvent thereafter removed by evaporation in the atmosphere. The paper is suitable for use as intermediate carrier or for punching intermediate carrier pieces.

EXAMPLE 4

1 part of the blue dyestuff 1-amino-2-cyano-4-anilino-anthraquinone is dissolved in 9 parts of dimethylformamide. A strip of unsized paper is dipped briefly into the dyestuff solution and the solvent thereafter removed in a vacuum cabinet. A blue dyed paper is obtained that is suitable for the manufacture of pieces of intermediate carrier or as intermediate carrier.

A blue paper is obtained in similar manner if the dyestuff 1-amino-2-cyano-4-cyclohexylamino - anthraquinone is used.

EXAMPLE 5

20 parts of the blue dyestuff of the formula

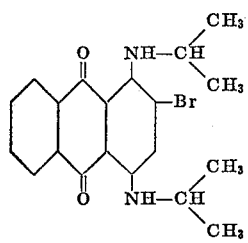

are ground in a sand mill with 20 parts of hydroxypropylcellulose (trade name Klucel J; Hercules) and 360 parts of water for 24 hours with cooling. The ground substance is subsequently dehydrated by spray drying. A soft, blue powder is obtained that can be redispersed to form a ready-made printing or dyeing ink by means of simply stirring the powder into water and/or certain organic solvents.

EXAMPLE 6

1 part of the blue dyestuff mentioned in Example 5,
1 part of ethyl cellulose (Ethocel E7, Dow Chem.),
4 parts of ground sodium chloride and
1 part of diacetone alcohol are kneaded in a kneading machine for 4 hours at 40–45° C. The dough is granulated by adding 1 part of water and thereafter subjected to a wet grinding by using approx. 50–100 parts of water. The resulting suspension is filtered, washed free of solvent and salt with water and the filter cake obtained dried in a vacuum cabinet at approx. 80° C. A blue preparation is obtained that is excellently suitable for the penetration dyeing of graphic printing inks.

EXAMPLE 7

1 part of the blue dyestuff 1-amino-2-bromo-4-isopropylamino-anthraquinone,
1 part of Ethocel E7 and
8 parts of water are ground for 8 hours in an attrition or sand mill. The ground substance is separated from the auxiliary grinding elements, filtered, and the filter cake dried in a vacuum cabinet. A blue preparation is obtained corresponding to that of Example 6.

EXAMPLE 8

5 parts of the dyestuff preparation obtained in Example 6, consisting of equal parts of the blue dyestuff and ethyl cellulose (Dow Chem., Ethocel E7), are stirred for 30 minutes into a solution of 6.5 parts of ethyl cellulose in 88.5 parts of isopropyl alcohol, using a conventional two vane stirrer. The printing ink thus obtained, which displays a uniform, fine distribution of the dyestuff, can be used for the manufacture of intermediate carrier papers by dyeing, single-sided or two-sided printing, or spraying.

By proceeding in the manner described above, but using 5 parts of the preparation obtained in Example 5 or that according to Example 7, valuable blue printing inks are obtained likewise.

EXAMPLE 9

Circular cut pieces having diameters of 1–2 cm. are punched from the intermediate carrier papers, printed or dyed on one or both sides, which carrier papers are obtained by dyeing, single-colored or multi-colored patterned or patternless printing or spraying with coloring inks according to Examples 1–4 and 8. These cut pieces are scattered onto a polyester woven fabric and then heated for 30 seconds to 220° C. in contact with a heated plate (ironing press). A woven fabric with a blue spot pattern Blue patterns with good properties are also obtained on a white background is obtained.
under the same conditions with the uncut papers, if these are applied to polyester or polyamide fabrics.

MANUFACTURING INSTRUCTIONS

Bromination of 1,4 - bis-(isopropylamino) - anthraquinone: 4 parts of boric acid, 1 part of iodine, 0.5 part of iron powder and 12.8 parts of bromine are added to a solution of 13 parts of 1,4-bis-(isopropylamino)-anthraquinone in 120 parts of sulphuric acid monohydrate. The mixture is stirred at 80° C. until a processed sample corresponds to the bromine content of the 1,4-bis-(isopropylamino) - 2 - bromo - anthraquinone. The batch is stirred into 300 parts of ice, the resulting precipitate filtered off and washed until neutral.

40 parts of a blue dyestuff of the formula

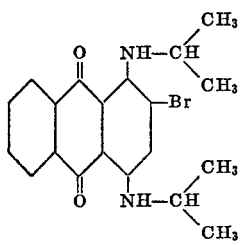

are obtained.

Bromination of 1 - amino - 4 - isopropylamino - anthraquinone: A mixture of 28 parts of 1-amino-4-isopropyl-amino-anthraquinone, 4 parts of boric acid, 1 part of iodine and 0.5 part of iron powder in 150 parts of glacial acetic acid is mixed with 32 parts of bromine. The mixture is stirred at 80° C. until a processed sample corresponds to the bromine content of the 1-amino-2-bromo-4-isopropylamino-anthraquinone. Upon cooling to ambient temperature the batch is stirred into 300 parts of ice-water, the resulting precipitate filtered off and washed until neutral.

25 parts of a blue dyestuff of the formula

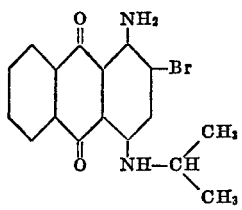

are obtained.

1,4-bisalkylamino-anthraquinones can be manufactured according to M. S. Simon, I. Am. Chem. Soc., 85, 1974 (1963) or according to J. A. McSheehy, U.S. Pat. 2,727,045.

To manufacture 1-amino-2-cyano-4-(phenyl or cyclohexyl)-amino-anthraquinones, 1-amino-2-sulpho-4-bromo-anthraquinone is reacted in aqueous solution with aniline or cyclohexylamine. The resulting 1-amino-2-sulpho-4-(phenyl or cyclohexyl)-amino-anthraquinones are reacted in aqueous solution with sodium chloride to form 1-amino-2-cyano-4-(phenyl or cyclohexyl)-amino-anthraquinone (cf. U.S. Pats. 2,795,593, 1,938,029, 2,496,414 and 2,587,002, British Pat. 614,969, German Pat. No. 536,998 and Bros. Report No. 1484/P.55).

What is claimed is:

1. An insoluble transfer stratum having a dyestuff of the formula

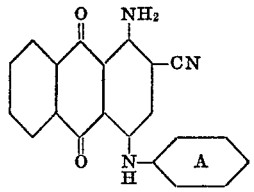

in which ring A is aromatic or saturated, printed thereon.

2. A transfer stratum according to claim 1 which consists of paper.

3. A transfer stratum according to claim 1 in which a cellulose ether or cellulose ester is used to bind the dyestuff to the transfer stratum.

4. In the process for sublimation transfer printing textiles of hydrophobic synthetic fibers the step comprising transferring a dyestuff of the formula

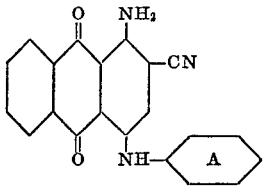

in which ring A is aromatic or saturated, to the synthetic textile.

5. A process according to claim 4 in which a web of fabric is strewn with pieces of paper which are impregnated with at least one of said dyestuffs and the dye is transferred from the pieces of paper.

6. A process according to claim 4 in which the textile is polyamide.

References Cited

UNITED STATES PATENTS

| | | | |
|---|---|---|---|
| 3,363,557 | 1/1968 | Blake | 101—470 |
| 1,938,029 | 12/1933 | Kugel | 260—60 |
| 2,496,414 | 2/1950 | Seymour et al. | 260—380 |

OTHER REFERENCES

American Dyestuff Reporter, Jan. 4, 1965, pp. 26–38.
Colour Index, vol. 4, pp. 4019–4021, pub. 1956 by Soc. Dyers & Colourists, Yorkshire, England.

DONALD LEVY, Primary Examiner

U.S. Cl. X.R.

8—14, 39, 25, 26, 43, 21 R, 94, 85, 93, 62; 117—33.5